United States Patent Office 3,014,474
Patented Dec. 26, 1961

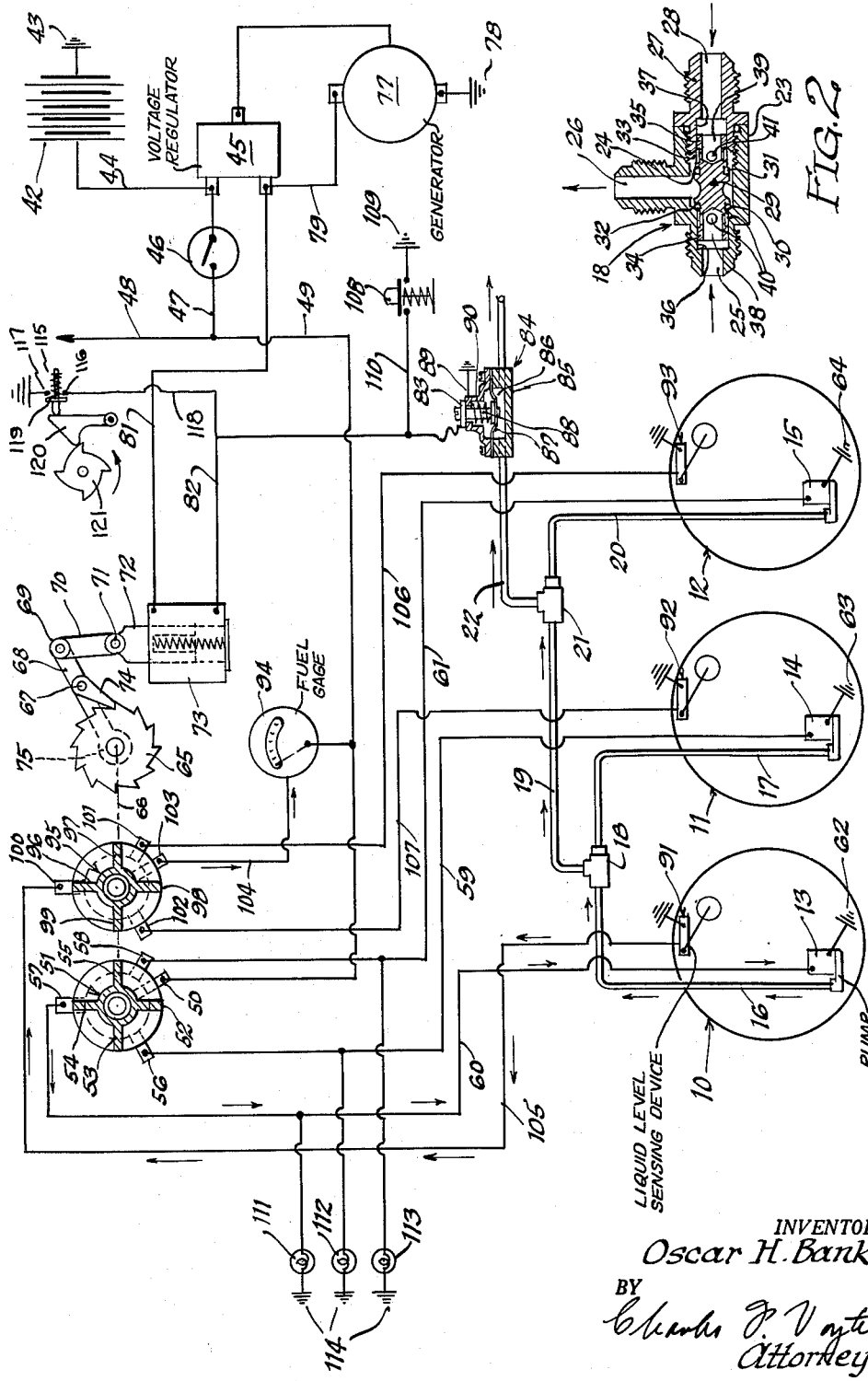

3,014,474
MULTI TANK FUEL SYSTEM WITH
AUTOMATIC CHANGEOVER
Oscar H. Banker, Evanston, Ill., assignor, by mesne assignments, to Fawick Corporation, Cleveland, Ohio, a corporation of Michigan
Filed May 31, 1957, Ser. No. 662,769
3 Claims. (Cl. 123—127)

This invention relates to an automatic switching system for multiple fuel tanks for engines for vehicles or the like.

It is common practice to install more than one fuel tank for commercial vehicles such as trucks and buses. This is brought about largely because space limitations and certain safety requirements make it more expedient to divide the fuel supply into two or more separate units. Furthermore, where the commercial vehicle is used exclusively in a city or town having many convenient service stations, a saving in the original cost of the vehicle can be effected by purchasing it equipped with but one relatively small tank which may be replenished at frequent intervals. Where the vehicle is to be used for long hauls the small tank becomes inadequate due to the less convenient spacing of service stations and the cost of making frequent stops. The cross country trucks and buses therefore are supplied with additional tanks, with means for selectively connecting the fuel line of the engine of the vehicle to the tank which is full, or which contains an adequate supply of fuel.

Where a plurality of fuel tanks is used, the means heretofore used to switch from one tank to another was entirely manual so that the driver of the vehicle had to be alert to the condition of the tank then in use so that he could switch over to a full tank when the one then in use became empty.

It is one of the objects of this invention to provide a multiple tank fuel system for vehicles wherein means are provided for automatically switching the fuel line of the engine of the vehicle from an empty tank to a full tank while the vehicle is in motion and without requiring any attention on the part of the vehicle driver.

It is also common practice in commercial vehicles to extract the fuel from a fuel tank by means of a combined pump and motor submerged in the fuel in the tank, and to provide a switch for controlling the operation of the pump motor. It is another object of this invention to provide automatic switching means for controlling the operation of two or more submerged electrically driven pumps, the operation of the switching means being controlled by a pressure sensitive switch influenced by the pressure of the fuel in the fuel line to the engine.

Where more than one fuel tank is used, it is important for the vehicle operator to know which tank is full and which is empty so that upon exhausting the fuel in one tank, he may know whether to continue driving and rely upon the next tank, or stop and refuel. Ordinarily, each fuel tank is supplied with its own fuel level indicator, which means a duplication of instrumentation.

A further object of this invention is the provision of means for indicating the amount of fuel in a fuel tank, said indicating means being common to a plurality of tanks, with additional means for indicating which of the tanks is being measured.

In aircraft using multiple fuel tanks it is desirable for purposes of balance or "trim" of the aircraft to withdraw fuel alternately from tanks on opposite sides of the center of gravity of the aircraft rather than to drain one tank completely before going to the next tank. It is a further object of this invention to provide a multiple tank fuel system for vehicles, particularly aircraft, ships, etc. with means for extracting fuel sequentially from two or more tanks at short time intervals so that the weight distribution of the fuel over the vehicle will remain substantially the same regardless of the quantity of fuel extracted from the tanks.

These and other objects and features of this invention will become apparent from a detailed description of the invention which follows when taken together with the accompanying drawings in which, FIG. 1 is a schematic diagram of a multi-tank fuel system for a vehicle or the like incorporating this invention; and FIG. 2 is an enlarged sectional view of a selector valve which may be advantageously used in the system of FIG. 1.

The selector valve used in the present illustrative example of the invention and the method of connecting the valve to the fuel tanks are disclosed and claimed in my U.S. Patent No. 2,821,972 for System for Emptying a Plurality of Tanks and Shuttle Valve Therefor.

Referring now to the drawings for a detailed description of the invention and particularly to FIG. 1, there are shown for purposes of illustration three fuel tanks designated 10, 11 and 12, each of which is supplied with a submerged pump and electric drive motor therefor shown schematically at 13, 14 and 15, respectively. In accordance with the system disclosed in my aforesaid application, the output lines 16 and 17 from the pumps 13 and 14, respectively, are connected to a selector valve 18, the details of which are shown in FIG. 2 and will be described hereinafter, and the output from selector valve 18 and the output of fuel pump 15 are conducted through lines 19 and 20, respectively, to a second selector valve 21 which is identical in every respect with selector valve 18. The output from selector valve 21 is conducted through a line 22 either to the engine (not shown) or to a third selector valve, if more than three tanks are used in the system.

Referring to FIG. 2, each selector valve 18 and 21 may comprise a valve body 23 having a valve chamber 24 substantially centrally located therein and connected to an inlet opening 25 and an outlet opening 26. A fitting 27 is threaded into valve body 23 substantially in axial alignment with valve chamber 24 and inlet opening 25, and is provided with a second inlet opening 28. A shuttle valve 29 is disposed within valve chamber 24 and has axially spaced annular resilient sealing means 30 and 31. Conical seats 32 and 33 are found in valve body 23 and in the end of fitting 27 against which the annular sealing means 30 and 31, respectively, may seat to form a fluid-tight seal between the valve body and shuttle valve 29. The ends 34 and 35 of shuttle valve 29 are slidably received in counterbores 36 and 37 in valve body 23 and fitting 27, respectively, and are also found with recesses 38 and 39 opening into inlet openings 25 and 28, respectively, and connected through cross bores 40 and 41 to the exterior of the shuttle valve.

Line 16 may be connected to inlet opening 25, line 17 may be connected to inlet opening 28 and line 19 may be connected to outlet opening 26. Thus, the ends of shuttle valve 29 will be subjected to the fluid pressure existing in lines 16 and 17 and will be moved to one or the other of the seats 32 and 33 depending upon the differences in pressure in the fluid in the lines 16 and 17. For example, if pump and motor 13 is operating and pump and motor 14 is not, then the pressure in line 16 will exceed that in line 17 and valve 29 will be moved to the right as viewed in FIG. 2 until ring 31 seats upon valve seat 33 to close off line 17 and opens line 16 to outlet line 19. Conversely, should tank 10 be empty and pump and motor 13 be inoperative while fuel is present in tank 11 and pump and motor 14 is operating, then the pressure in line 17 will exceed that in line 16 and the shuttle valve 29 will assume the position shown in FIG. 2.

The combined fuel pumps and electric motors 13, 14 and 15 are energized by the vehicle battery 42 (FIG. 1), the circuit including a ground connection 43 to one side of battery 42, a conduit 44 connected to a voltage regulator 45 and to an ignition switch 46 which, in turn, is connected through a conduit 47 to the ignition circuit 48 and through a conduit 49 to a brush 50 in electrical contact with a rotatable switch 51 having four arms 52, 53, 54 and 55. Said switch arms are adapted to make contact with three equally spaced switch contacts 56, 57 and 58 connected through conduits 59, 60 and 61 to combined fuel pump and motors 14, 13 and 15, respectively. The switch arms and stationary contacts are so related that but one arm will be connected to a contact at any one time.

It may be observed from the description thus far given that with each of the motors of the combined motors and pumps 13, 14, and 15 grounded as shown at 62, 63, 64 respectively, such motor and pump combinations can be rendered effective selectively by rotating switch 51 so as to bring one of the switch arms associated therewith into contact with one of the contacts and thereby connect battery 42 to the motor and cause it to operate. In the form chosen to illustrate this invention the rotation of the switch 51 is effected by a ratchet wheel 65 mounted on a shaft 66 (shown schematically only) on which is also mounted the switch 51 so that rotation of the ratchet wheel 55 will cause a similar rotation of the switch 51. Step-by-step rotation of ratchet wheel 55 is effected by a pawl 74 pivoted at 67 on an arm 68 connected at 69 to a link 70, the other end of which is pivoted at 71 to the armature 72 of a solenoid 73. The arm 68 extends radially inwardly with respect to ratchet wheel 65 and is formed with a hub freely rotatable about shaft 66 so that when armature 72 is pulled into the winding of solenoid 73, the rectilinear movement of the armature will be translated into a curvilinear movement of pawl 74 which in turn will cause an angular movement of ratchet wheel 65.

The angular movement of ratchet wheel 65 for each operation of solenoid 73 is so related to the angular movement of switch 51 that for each operation of solenoid 73, that is, for each such angular movement of ratchet wheel 65, a switch arm of switch 51 will be disconnected from its contact and the next arm will be connected to the next contact. For example, assuming that switch 51 and its associated arms occupy the position with respect to the fixed contacts shown in FIG. 1, an operation of solenoid 73 will cause switch arm 54 to move away from its contact 57 to break the electrical circuit thereacross, and switch arm 55 will be caused to make contact with contact 58 to establish a circuit to conduit 61. It may be noted that switch arms 52 and 53 will not make contact with contacts 56 and 57 at this time. The next operation of solenoid 73 will break the connection to contact 58 and will complete the connection to contact 56. The next succeeding operation of solenoid 73 will break the connection to contact 56 but will establish the connection with contact 57. Thus, successive operations of solenoid 73 results in a progressive, sequential energization of lines 60, 61 and 59 leading to the motors of the combined pumps and motors 13, 15 and 14.

Solenoid 73 is energized from the generator for the vehicle, the circuit being established from a ground connection 78 on one side of generator 77 through the generator and thence through a conduit 79 leading to voltage regulator 45 and on to solenoid 73 through conduit 81.

The other side of solenoid 73 is connected through a conduit 82 to the switch arm 83 of a pressure operated switch shown in its entirety at 84 in schematic form. Said pressure-operated switch is comprised of a housing 85 having a chamber 86 therein which is in communication at all times with the fuel in fuel line 22. Chamber 86 is defined in part by a diaphragm 87 to which is connected a plunger 88 connected to switch arm 83 so that the latter is movable with the plunger at all times. Said switch arm 83 is electrically insulated from housing 85 by any suitable means (not shown) and housing 85 may be grounded as at 89 so that when switch arm 83 is pulled against the housing 85 by a compression spring 90 operating upon diaphragm 87 and plunger 88, switch arm 83 and its associated conduit 82 will be grounded.

Thus it may be apparent that solenoid 73 is energized solely from generator 77, and this only when contact is established between ground connection 89 and switch arm 83 of the pressure operated switch 84. It will also appear that diaphragm 87 which controls switch arm 83 through plunger 88 is motivated by the pressure of the fuel in line 22 so that when there is no pressure in the line, spring 90 controls and establishes the connection to ground from switch arm 83, and when fluid under pressure of a predetermined value is present in chamber 86 of the switch 84, diaphragm 87 moves plunger 88 outwardly of the housing against the action of spring 90 and breaks the connection between switch arm 83 and ground 89, thereby deenergizing solenoid 73. It is contemplated that spring 90 will be relatively light so that when the pressure in the fuel line 22 is that normally found in the line when fuel is being pumped to the engine, that is, at approximately four pounds per square inch, solenoid 73 will be deenergized.

The operation of the system is as follows:

Assuming that the vehicle is stationary and the engine is not running, no current will be put out by generator 77 and hence solenoid 73 cannot be energized, regardless of the condition of the fluid in fuel line 22.

When it is desired to start the engine, the vehicle driver will close ignition switch 46 thereby sending current through that switch arm of rotary switch 51 which is at the moment connected to a contact 56, 57 or 58. Assuming for purposes of illustration that the switch arm is in the position shown in FIG. 1 wherein arm 54 is connected to contact 57, the motor-and-pump combination 13 will then be energized and will begin to operate. Switch arm 83 of pressure operated switch 84 is grounded at the start because of the absence of fuel under pressure in line 22, and is then disconnected due to the commencement of the operation of the motor-and-pump combination 13 which begins to supply fuel under pressure through line 16, selector valve 18, line 19, selector valve 21, and line 22, thereby breaking the connection from switch arm 83 to ground. Solenoid 73 nevertheless will not be operated under these conditions since under starting conditions the generator does not produce enough current to cause the solenoid to energize. Switch arm 54 therefor will continue to be connected to contact 57 and to supply the motor-and-pump combination 13 with electric current for the continued operation of the pump and for the continuous supply of fuel to fuel line 22 while the engine is being started.

Just as soon as the engine starts, generator 77 will put out enough current so that when the circuit is completed through solenoid 73, said solenoid will be energized. However, the circuit through solenoid 73 will remain broken until the pressure in fuel line 22 drops below that required to overcome spring 90. This lack of pressure will not occur until tank 10 is exhausted, at which time the ensuing drop in pressure in line 22 will cause a completion of the circuit in the switch arm 83 of switch 84, and solenoid 73 will thereupon be energized. This, in turn, causes the linkage to pawl 74 to operate said pawl in its arcuate movement and causes a corresponding angular travel of ratchet wheel 65, its associated shaft 66, and the switch 51. As previously described, upon such angular travel, contact will be broken between arm 54 and contact 57, but will be established between arm 55 and contact 58, resulting in the operation of motor-and-pump unit 15 to supply fuel under pressure through line 20 and selector valve 21 to fuel line 22. The resumption of flow of fuel under pressure through pressure operated switch 84 causes diaphragm 87 to move plunger 88 outwardly against the action of spring 90 and to break the connection between switch arm 83 and ground connection 89.

The momentary reduction in flow of fuel in line 22 due to the exhaustion of tank 10 is not sufficient to cause a cessation of operation of the engine since the engine under these conditions will have enough gasoline in the bowl of its carburetor (not shown) to continue operating until the next tank is connected to line 22 and fuel is pumped thereinto from the combined pump-and-motor unit therein. Upon the exhaustion of the next tank the same sequence of events occurs whereby pump-and-motor unit 15 is deenergized and unit 14 becomes effective to begin supplying fuel from tank 11 to line 22.

As fully described in my aforesaid copending application, selector valves 18 and 21 will function automatically to close the line from the empty tank and to open the line from the tank containing fuel under pressure so that no manipulation of valves is required on the part of the operator during the switch-over from one tank to another.

In addition to automatic switching from one tank to another as fuel is exhausted from the tanks, the system is also provided with means for indicating which of the tanks has been exhausted so that the operator of the vehicle may know the extent of his fuel reserves. To this end each tank is provided with a liquid level sensing device of any known character 91, 92 and 93.

Each of the liquid level sensing devices is adapted to send an electric current to a fuel gage 94, preferably disposed within view of the vehicle driver and adapted to indicate the relative fullness of a tank. Although there is a plurality of tanks in the vehicle, only one such fuel gage is used with the system hereinafter described. Means are provided, however, for automatically switching the gage from one tank to the next in synchronism with the means for energizing the combined fuel pump-and-motor combinations 13, 14 and 15 so that the gage will indicate the relative fullness of the tank currently supplying fuel line 22 with fuel. Thus, a second four-armed rotary switch 95 is provided, said four-armed switch being mounted on and driven by the same shaft 66 which drives switch 51. The four arms are shown at 96, 97, 98 and 99 and the three cooperating fixed contacts are shown at 100, 101 and 102. Current for switch 95 is provided through a brush 103 which is connected to fuel gage 94 by a conduit 104. The other side of gage 94 is connected to conduit 49 which, as previously described, is connected to battery 42 through ignition switch 46. Contact 100 is connected through a conduit 105 to sensing device 91, contact 101 is connected through a conduit 106 to sensing device 93 and contact 102 is connected through a conduit 107 to sensing device 92.

In operation, gage 94 will not register until ignition switch 46 is closed, as is customary in all present day fuel gage installations. When ignition switch 46 is closed, a circuit will be completed through the gage 94 and then through the switch arm which at the moment is connected to a contact 100, 101 or 102 and then to the associated level sensing device. The switches 51 and 95 will be synchronized initially in the sense that a connection will be established to the motor-and-pump combination and level sensing device of the same tank. Gage 94, however, will be effective to indicate the relative fullness of a tank regardless of whether the motor-and-pump combination for that tank is operating. Upon a switch-over from one tank to another in the manner previously described, brought about by the successive operations of the pressure sensitive switch 84, solenoid 73 and switch 51 through shaft 66 and ratchet wheel 65, a corresponding switch-over from one level sensing device to the next will be effected through the switch 95. Inasmuch as the details of operation of the switch 95 are identical with those of switch 51, it is believed no further description will be necessary.

Under certain conditions it may be desirable for a driver to be able to tell at once the relative fullness of all of the tanks on the vehicle. This condition may arise when drivers are changed, or when the vehicle is serviced by someone in the absence of the driver who may be familiar with the condition of the tanks. To enable him to obtain this information quickly, a manually operated button switch 108 is provided in shunt relation to switch 84. Said button switch 108 may be located conveniently within reach of the vehicle driver and is effective to establish a ground connection 109 through a conduit 110 to conduit 82 around switch arm 83 and its associated ground connection 89. Thus, assuming that the engine is running and generator 77 is producing enough current to energize solenoid 73, each time button 108 is depressed to establish a ground connection to conduit 82, solenoid 73 will be energized and the switch 95 will be rotated to connect a different level sensing device to gage 94.

The specific tank, the level of which is being measured may be indicated by a plurality of lights 111, 112 and 113 connected respectively to conduits 60, 59 and 61 on one side and to ground 114 on the other so that whenever any of said conduits 60, 59 and 61 is connected to the battery 42 through ignition switch 46 and the intermediate connections as described above, each light in a suitable manner with a given tank, the driver can then determine the relative fullness of each tank from the gage 94. If the engine is not running, he can measure only the tank the combination pump-and-motor of which is then connected to the battery, but when the engine is running he can quickly determine the condition of each of the tanks in the system.

The foregoing system can readily be adapted to use in aircraft, either as just described, or by the addition of a timing switch connected in parallel with switch 84. Such switch is shown schematically at 115 and may comprise a pair of contacts 116, 117, the first of which is connected through a conduit 118 to conduit 82 and the second of which is connected to ground. A switch arm 119, spring biased away from contacts 116, 117 is adapted to be urged against said contacts to complete a circuit thereacross by a lever 120 and a cam 121 rotated by a suitable clock mechanism (not shown). The cam may rotate once per hour and have four lobes as shown to give an operation of the switch 115 every fifteen minutes, or it may be provided with cams having different numbers of lobes, or with variable speed drive mechanisms for the same cam. Other constructions for periodically completing an electric circuit will suggest themselves to those skilled in the art.

Since timed switch 115 is in parallel with switch 84, it will have the same effect upon the system as said switch 84, viz., it will switch the system from one tank to the next and will do so as a function of time, rather than as a function of the quantity of fuel in a tank. Obviously the angular spacing of the lobes on the cam may be varied if it is desired to remove more fuel from one tank than from another because of differences in size of tank or capacities of pumps, etc.

It may be apparent from the foregoing description that the system will enable a driver of a vehicle to proceed without watching the condition of his tanks other than to make a rough check in accordance with the distance travelled when the last of his tanks may be getting low. Prior to that time, an automatic switchover will be made from an empty tank to a full tank without any effort on the part of the driver. It may also be apparent that by energizing the solenoid 73 from the generator instead of from the battery, repeated operation of the ignition switch to operate other mechanisms in the vehicle such as a heater, radio, etc., does not upset the fuel tank selecting mechanism and cause it to come to rest at an empty tank.

It may also be apparent that instead of connecting a source of electrical energy directly to a motor, the system may be utilized to connect such energy source to a relay or solenoid which in turn controls either a larger electric motor, or valves which control the flow from each reservoir or tank regardless of how the fluid is brought to the valves.

It is understood that the foregoing description is merely illustrative of a preferred embodiment of the invention and that the scope of the invention is not to be limited thereto but is to be determined by the appended claims.

I claim:

1. A system for continuously supplying liquid under pressure to a prime mover, said system comprising a plurality of reservoirs containing said liquid, a plurality of electrically driven pump means each having an intake side thereof connected to the interior of a reservoir such that there is one pump means for each reservoir, a supply pipe for conducting liquid under pressure from said reservoirs to the prime mover, pressure differential operating means connecting the outlet side of each operative pump to the supply pipe while closing the outlet side of a non-operative pump to said supply pipe, a pressure responsive switch operated to close by a decrease in the pressure of the fluid in the supply pipe resulting from the exhaustion of fluid in a reservoir being pumped, a source of electrical energy for the electrically driven pumps, circuit means including sequence switch means for mutually exclusively connecting the electrically driven pumps to said source of electrical energy whereby to insure the operation of but one pump at a time, and electro-magnetically operated means energized by the closing of the pressure responsive switch for operating the sequence switch to de-energize a pump connected to an exhausted reservoir and to energize a pump connected to a reservoir containing fluid.

2. A system as described in claim 1, said means operated by the pressure sensitive switch means comprising a ratchet and pawl and relay means for operating said pawl, and said multiple position switch means comprising a rotating arm and a plurality of contacts, one for each electrically driven pump means, said arm being rotated by the ratchet and pawl through a predetermined angle upon each energization of the relay means.

3. In a fuel feeding system for a prime mover, the combination of an ignition switch for the prime mover, an electric generator driven by said prime mover, a source of electrical energy, a plurality of tanks for storing fuel for the prime mover, an electrically driven pump for each tank, each of said pumps having an outlet and an inlet in communication with the interior of its said tank to pump out the contents of said tank, a fuel line for conducting fuel to said prime mover, conduits connected to the outlet of each pump, pressure differential operated valve means responsive to the pressure in the outlets of a pair of said pumps and adapted to connect the conduit having the highest pressure to the fuel line, circuit means including switch means for sequentially completing an electric circuit from the source of electrical energy through the ignition switch to the electrically driven pumps to energize said pumps individually, electromagnetic means for operating the switch means sequentially, means establishing an electrical connection from the electromagnetic switch operating means to the output of the generator to energize the electromagnetic switch operating means only while the generator is operative, and other switch means, operable upon the attainment of a predetermined pressure in the said fuel line, for breaking the circuit through the electromagnetic means.

References Cited in the file of this patent

UNITED STATES PATENTS

| | | |
|---|---|---|
| 1,581,595 | Osborne | Apr. 20, 1926 |
| 2,146,729 | Gavin | Feb. 14, 1939 |
| 2,356,200 | Bedard | Aug. 22, 1944 |
| 2,406,854 | Samiran | Sept. 3, 1946 |
| 2,519,968 | Jordan | Aug. 22, 1950 |
| 2,781,727 | Marshall et al. | Feb. 19, 1957 |